United States Patent
Kumar et al.

(10) Patent No.: US 7,437,506 B1
(45) Date of Patent: Oct. 14, 2008

(54) METHOD AND SYSTEM FOR VIRTUAL STORAGE ELEMENT PLACEMENT WITHIN A STORAGE AREA NETWORK

(75) Inventors: Mukul Kumar, Maharashtra (IN); Subhojit Roy, Maharashtra (IN)

(73) Assignee: Symantec Operating Corporation, Cupertino, CA (US)

( * ) Notice: Subject to any disclaimer, the term of this patent is extended or adjusted under 35 U.S.C. 154(b) by 328 days.

(21) Appl. No.: 10/834,602

(22) Filed: Apr. 26, 2004

(51) Int. Cl.
*G06F 12/00* (2006.01)
(52) U.S. Cl. ........................ 711/114; 709/224
(58) Field of Classification Search ................. 711/114
See application file for complete search history.

(56) References Cited

U.S. PATENT DOCUMENTS

| | | | |
|---|---|---|---|
| 6,021,405 A * | 2/2000 | Celis et al. ................. 707/2 |
| 2002/0174306 A1 * | 11/2002 | Gajjar et al. ............... 711/148 |
| 2003/0093501 A1 * | 5/2003 | Carlson et al. ............. 709/220 |
| 2003/0131182 A1 * | 7/2003 | Kumar et al. ............... 711/5 |
| 2003/0135609 A1 * | 7/2003 | Carlson et al. ............. 709/224 |
| 2004/0193827 A1 * | 9/2004 | Mogi et al. ................. 711/170 |

* cited by examiner

*Primary Examiner*—Kevin Ellis
*Assistant Examiner*—Hashem Farrokh
(74) *Attorney, Agent, or Firm*—Campbell Stephenson LLP

(57) ABSTRACT

A method and system for virtual storage element placement within a storage area network is disclosed. According to one embodiment of the present invention, first data is received which specifies an access characteristic of a virtual storage element to be associated with a storage area network. Once received, the first data is used along with second data specifying a topology of a storage area network to select a virtualization device of the storage area network. According to another embodiment of the present invention, third data specifying a characteristic of one or more virtualization devices of the storage area network is additionally used to select the virtualization device. Thereafter, the virtual storage element to be associated with the storage area network is associated with the selected virtualization device.

18 Claims, 8 Drawing Sheets

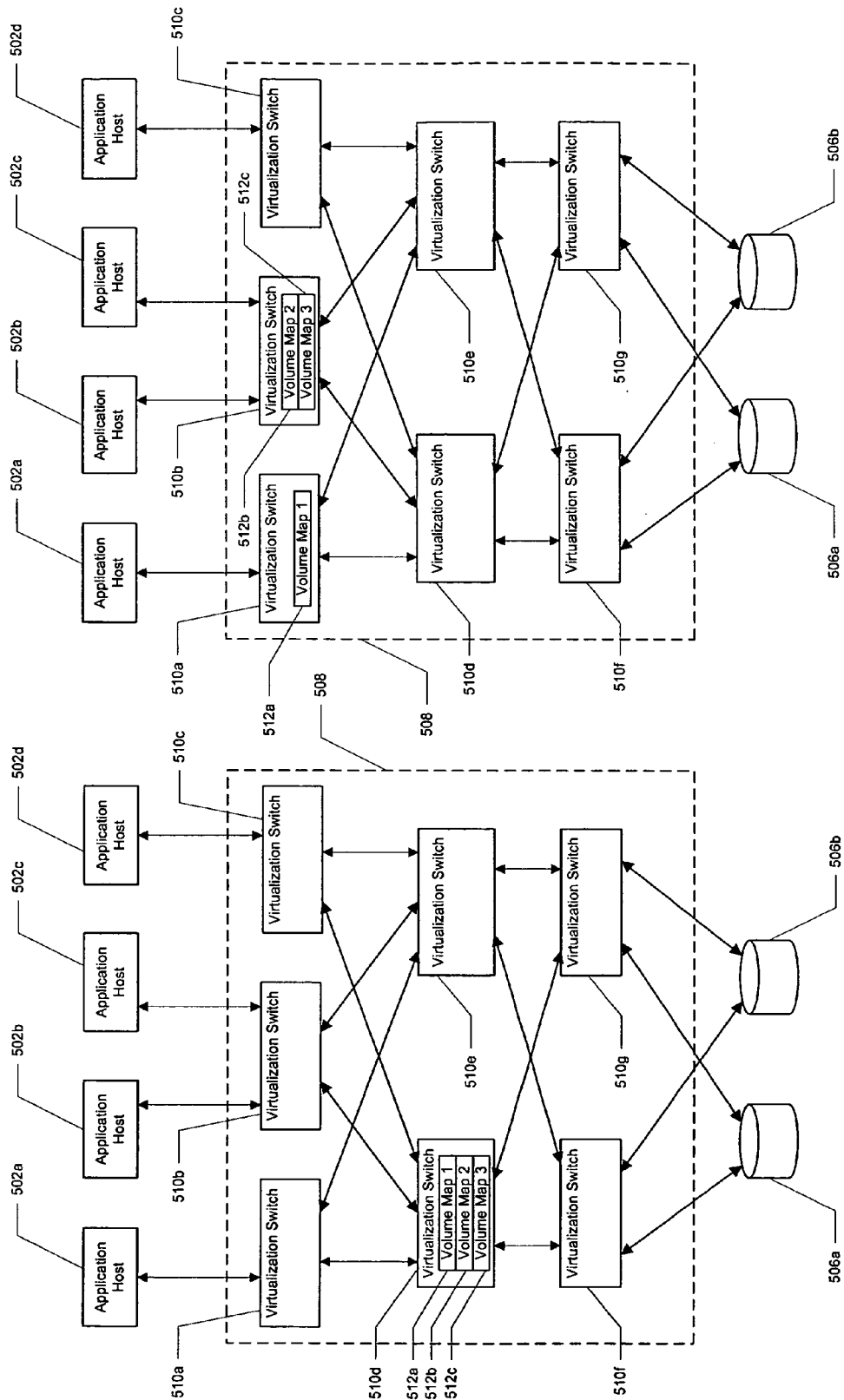

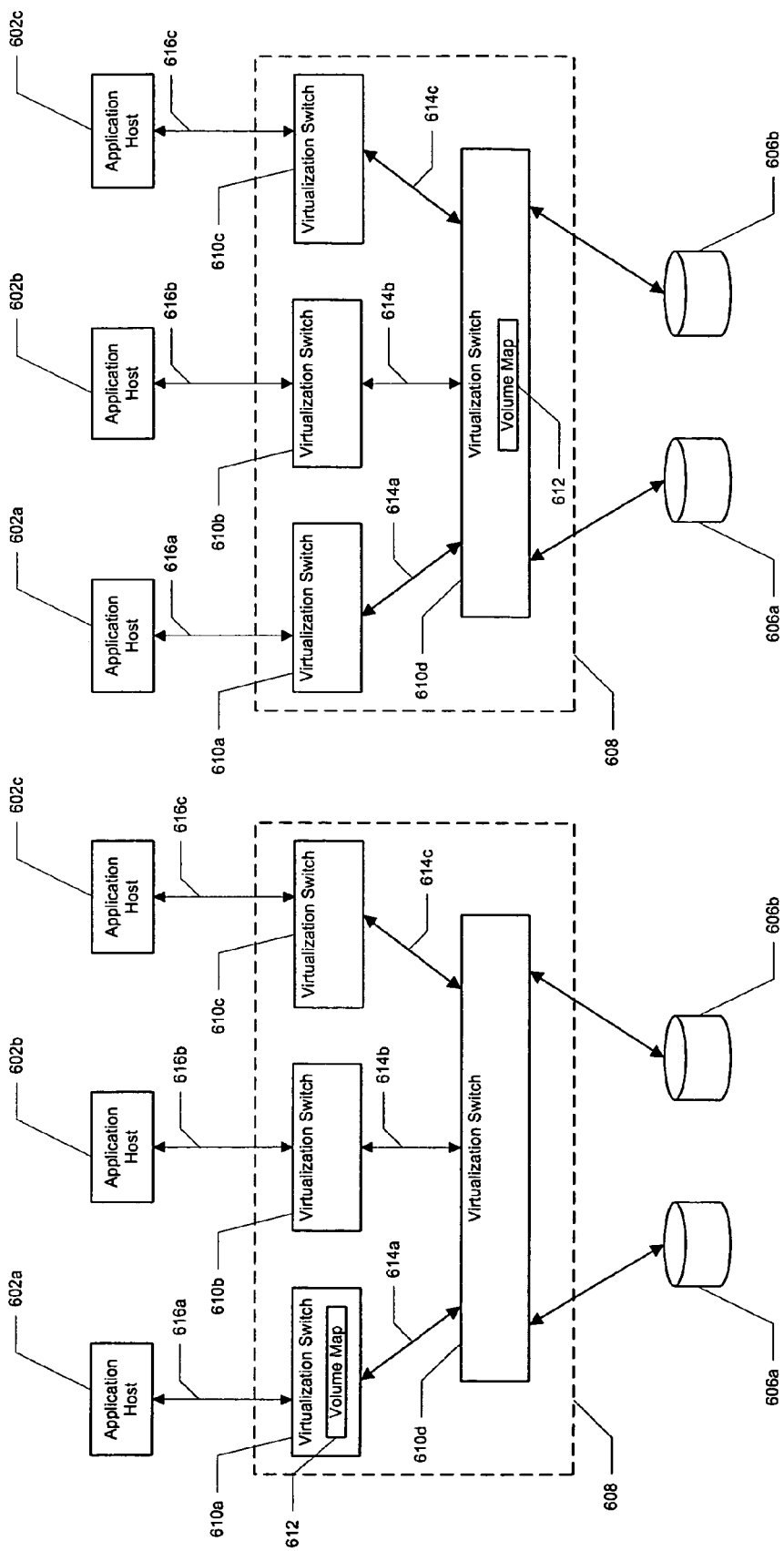

METHOD AND SYSTEM FOR VIRTUAL STORAGE ELEMENT PLACEMENT WITHIN A STORAGE AREA NETWORK

BACKGROUND OF THE INVENTION

1. Field of the Invention

The present invention relates to data storage and retrieval generally and more particularly to a method and system for virtual storage element placement within a storage area network.

2. Description of the Related Art

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Storage virtualization is one technique which is used to simplify the storage and provision of data from the perspective of application host data processing systems and users. Storage virtualization is the application of virtualization to storage services or devices for the purpose of aggregating, hiding complexity or adding new capabilities to lower level storage resources. Using storage virtualization, the internal function of a storage (sub) system(s) or service(s) are abstracted, hidden, or isolated from applications, application host data processing systems, or general network resources for the purpose of enabling application and network-independent management of storage or data. Storage can be virtualized simultaneously in multiple layers of a system, and storage virtualization may be provided at the application host, network interconnect, or storage device level.

Where storage virtualization is implemented with a storage area network (SAN), virtual storage elements (e.g., Virtual Logical Units or "VLUNs") are presented to application host data processing systems using virtualization devices (e.g., virtualization switches where virtualization is provided at the network interconnect level). Selecting which virtualization device will be associated with, and therefore use to present a virtual storage element can be a complex, slow, and error-prone process, particularly where the number of virtualization devices within a storage area network is large.

SUMMARY OF THE INVENTION

Disclosed is a method and system for virtual storage element placement within a storage area network. According one embodiment of the present invention, first data is received which specifies an access characteristic of a virtual storage element to be associated with a storage area network. In the described embodiment, the storage area network comprises a storage area network interconnect which in turn comprises a plurality of virtualization devices. Once received, the first data is used along with second data specifying a topology of the storage area network to select a virtualization device of the plurality of virtualization devices. According to another embodiment of the present invention, third data specifying a characteristic of one or more of the plurality of virtualization devices (e.g., the maximum number of virtual storage elements which may be associated with each virtualization device) is additionally used to select the virtualization device. Thereafter, the virtual storage element to be associated with the storage area network is associated with the selected virtualization device.

Embodiments of the present invention may be used to automate the process by which a virtualization device (e.g., a virtualization switch) within a storage area network is associated with a virtual storage element (e.g., a VLUN) so that the virtual storage element may be presented or "exported" to one or more host data processing systems. By applying an appropriate one of several virtualization device selection processes (i.e., heuristics) automatically in response to a request to associate a virtual storage element with a storage area network, an optimal virtualization device may be selected and virtual storage element creation and presentation may be improved.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which:

FIG. 2b illustrates a block diagram representation of a storage resource management host memory such as memory 206 of the embodiment of FIG. 2a.

FIGS. 5a and 5b illustrate a second exemplary application of a first virtualization device selection heuristic according to an embodiment of the present invention;

FIGS. 6a and 6b illustrate an application of a second virtualization device selection heuristic according to an embodiment of the present invention;

The use of the same reference symbols in different drawings indicates similar or identical items.

DETAILED DESCRIPTION

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
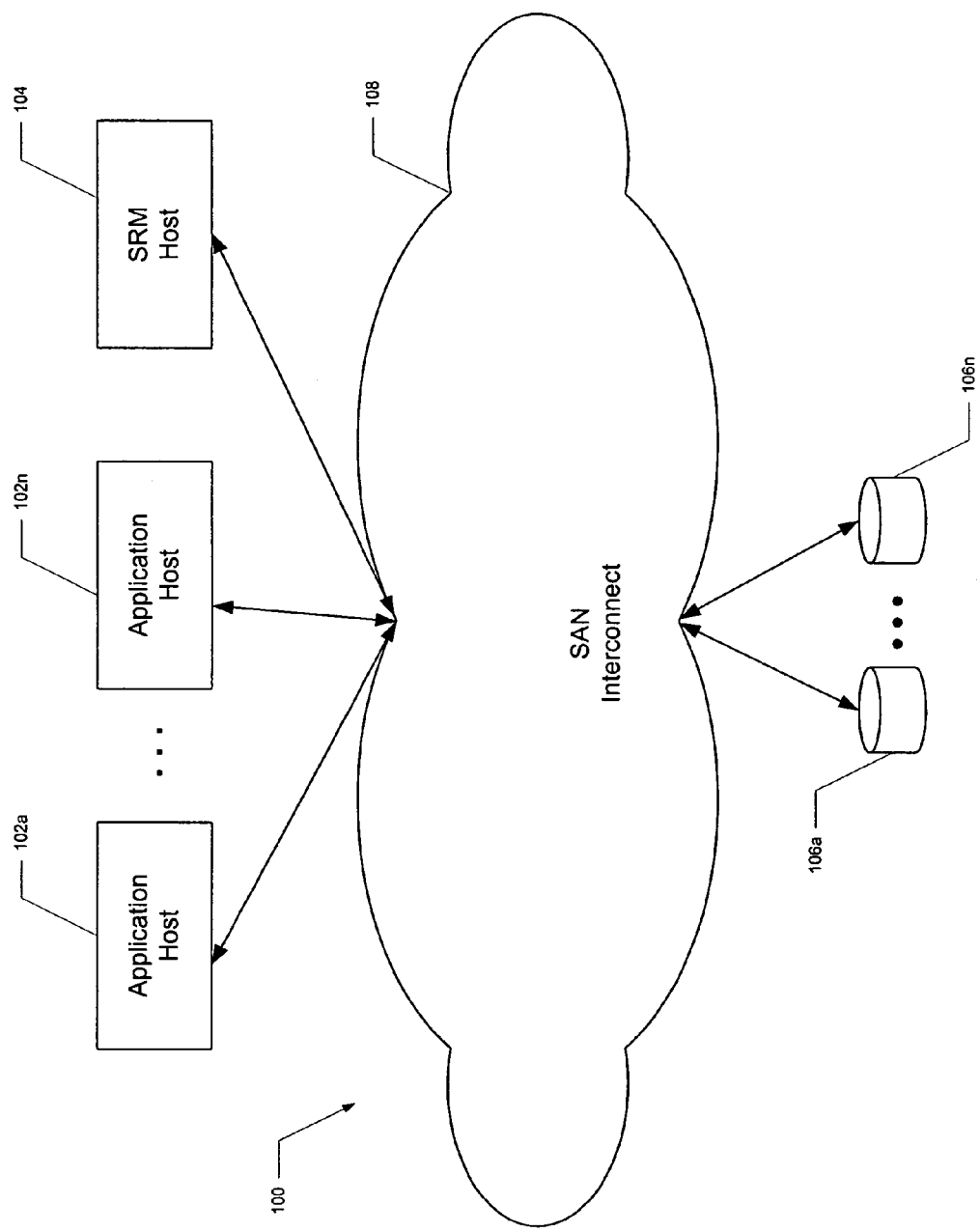
FIG. 1 illustrates a storage area network useable with one or more embodiments of the present invention.

FIG. 1 illustrates a storage area network useable with one or more embodiments of the present invention. A "storage area network" or "SAN" such as SAN 100 of the illustrated embodiment of FIG. 1 is a high-speed special-purpose network (or subnetwork) that interconnects data storage devices with host data processing systems using one or more SAN interconnects (e.g., a SAN fabric or other communication medium). Typically, a storage area network is part of the overall network of computing resources for an enterprise. SAN 100 includes a plurality of application hosts 102a-102n and a storage resource management (SRM) host 104 coupled to one or more data storage elements 106a-106n (e.g., Logical Unit Numbers) via a SAN interconnect 108. Although a single SAN interconnect 108 has been illustrated in FIG. 1, any number of independent SAN interconnects may be included within a SAN according to alternative embodiments of the present invention.

Data storage elements 106 may be provided within one or more data storage devices (e.g., one or more disk storage arrays, or the like). A "host" within the present description may include any device or program that provides services to smaller or less capable device(s) or program(s) (e.g., a server computer system, appliance, or the like). SAN interconnect 108 of the illustrated embodiment may include a number of virtualization devices as further described herein. According to one embodiment, SRM host 104 may incorporate metadata host functionality. A "virtualization device" with the present description includes any device configured to provide storage virtualization to one or more application hosts. Using the virtualization devices of SAN interconnect 108 and the functionality of SRM host 104, a layer of abstraction is provided between application hosts 102a-102n and data storage elements 106a-106n such that data storage elements 106a-106n may be used to present one or more virtual storage elements (e.g., Virtual Logical Units or "VLUNS") to one or more of application hosts 102a-102n.

Figure 2A:
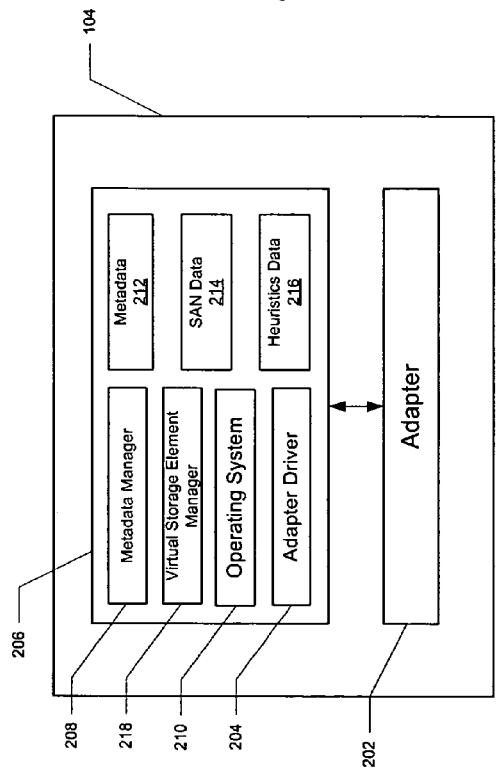
FIG. 2a illustrates a block diagram representation of a storage resource management host such as storage resource management host 104 of the embodiment of FIG. 1.

FIG. 2a illustrates a block diagram representation of a storage resource management host such as storage resource management (SRM) host 104 of the embodiment of FIG. 1. SRM host 104 of the illustrated embodiment includes an adapter 202 configured to be coupled to SAN interconnect 108 and functionally coupled to SRM host 104 via an adapter driver 204 stored within a memory 206 as shown. Memory 206 further includes a metadata manager 208, an operating system 210, metadata 212, SAN data 214 (e.g., SAN topology data and/or virtualization device data), heuristics data 216 (e.g., one or more virtualization device selection heuristics), and a virtual storage element manager 218 according to an embodiment of the present invention. Using metadata manager 208, SRM host 104 is responsible for managing and maintaining metadata within SAN 100. Metadata manager 208 receives and services requests relating to storage metadata (e.g., volume metadata, Fibre Channel metadata, SCSI metadata, or the like) such as metadata 212 (e.g., requests to create, delete, extend, truncate, and/or move storage elements, volumes, or the like). Similarly, using virtual storage element manager 218, SRM host 104 is responsible for the placement of virtual storage elements within SAN 100.

According to one embodiment of the present invention, virtual storage element manager 218 is configured to receive first data which specifies an access characteristic of a virtual storage element to be associated with storage area network 100 and to use the first data along with second data specifying a topology of storage area network 100 to select a virtualization device within SAN interconnect 108 of storage area network 100. In the described embodiment, virtual storage element manager 218 is further configured to associate the selected virtualization device with the virtual storage element to be associated with storage area network 100 by storing a volume map corresponding to the virtual storage element on the selected virtualization device.

Figure 2B:
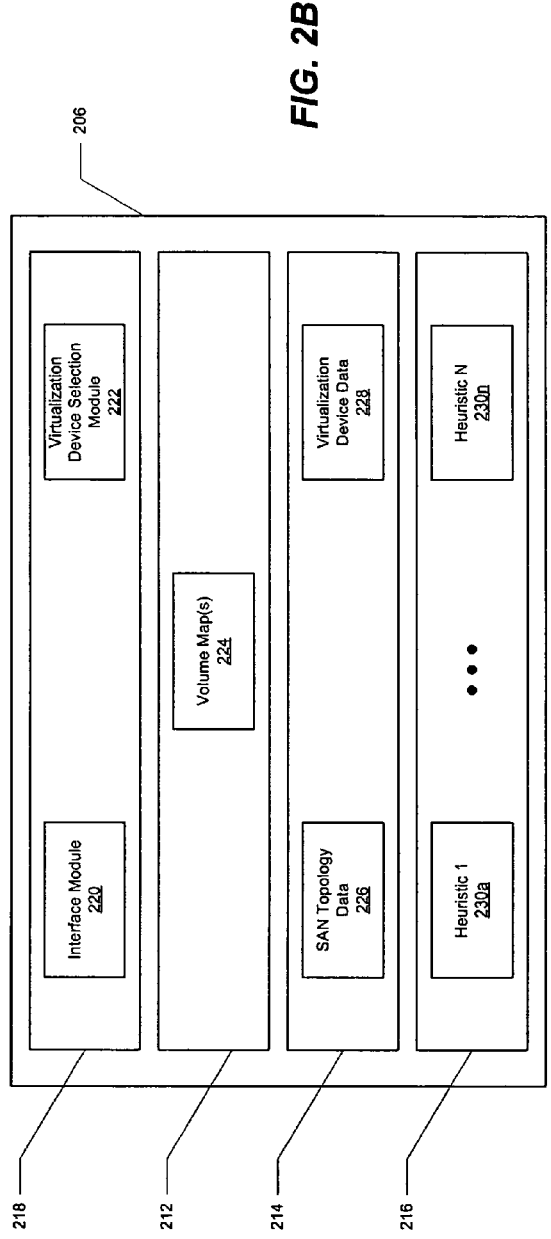

FIG. 2b illustrates a block diagram representation of a storage resource management host memory such as memory 206 of the embodiment of FIG. 2a. Metadata 212 includes data associated with (e.g., describing or used to access) data within one or more data storage elements within SAN 100. More specifically metadata 212 within the embodiment of FIG. 2b includes one or more volume maps 224 specifying a mapping between virtual storage elements and storage devices (e.g., physical disk, tape or solid state storage devices). Metadata 212 may include other or additional data associated with data within data storage elements 106a-106n such as one or more metadata database entries (not illustrated) each including data specifying a unique virtualization device identifier such as a Fibre Channel world wide port name and/or world wide node name and a switch Internet Protocol (IP) address of a virtualization device, thereby associating a virtualization device and described unique interconnect device identifier.

SAN data 214 of the embodiment of FIG. 2b includes SAN topology data 226 and virtualization device data 228. Within the present description, SAN topology data 226 may include any data specifying the elements comprising a SAN (e.g., SAN 100) including virtualization devices (e.g., virtualization switches), host data processing systems, data storage devices, data storage elements, communication links (e.g., host-switch, inter-switch, or switch-data storage device links) and their physical or logical relationship to one another. According to one embodiment, SAN topology data 226 includes data specifying the available bandwidth of each link within a SAN and the elements to which each such link is coupled. In the embodiment of FIG. 2b, virtualization device data 228 includes additional data specifying attributes or characteristics of the virtualization devices of a SAN such as SAN 100. According to another embodiment, SAN topology data 226 includes an identifier specifying a SAN topology type (e.g., mesh, core-edge, cascade, or the like).

More specifically, virtualization device data 228 in one embodiment includes data specifying limitations of each virtualization switch of SAN 100 such as the maximum bandwidth, the maximum number of virtual storage elements or ports, the maximum number of faults (e.g., cache misses), and/or the maximum number of operations (e.g., snapshot, replication, or the like) that each virtualization switch can support. Heuristics data 216 of the illustrated embodiment includes virtualization device selection heuristics 230a-230n. Each of virtualization device selection heuristics 230a-230n in turn includes data specifying a process or one or more rules for selecting a virtualization device from a SAN (e.g., a virtualization switch from SAN interconnect 108) for association with a virtual storage element (e.g., a VLUN) to be presented with the SAN.

Each of metadata 212, SAN data 214, and heuristics data 216 of the embodiment of FIG. 2b are used by virtual storage element manager 218 for the placement of virtual storage elements within a storage area network 100. While a greater or lesser number of components may be implemented in alternative embodiments of the present invention to provide the described functionality, virtual storage element manager 218 of the illustrated embodiment includes an interface module 220 used to prompt a user for additional data specifying an access characteristic of a virtual storage element to be placed within SAN 100 and to receive such additional data and a virtualization device selection module 222 used to select an optimal virtualization device from SAN 100 for association with a virtual storage element. Such access characteristics may include, but are not limited to, data specifying or identifying each host data processing system which is configured to or capable of accessing an associated virtual storage element and/or the bandwidth link required or desired by each such host data processing system.

Figure 3:
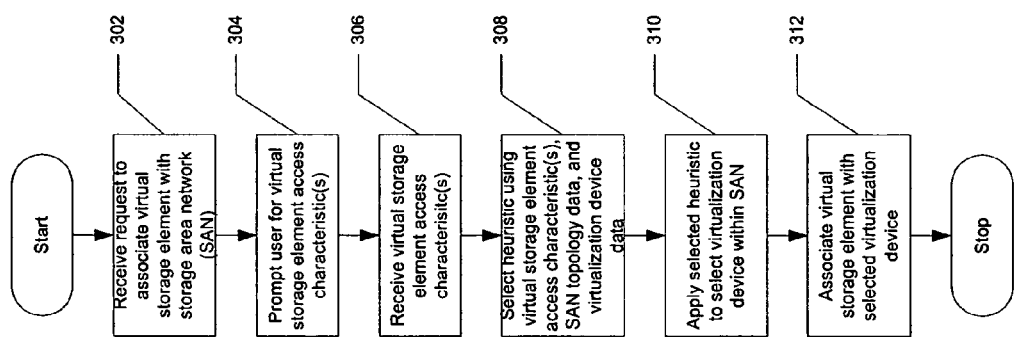
FIG. 3 illustrates a process flow diagram of a virtual storage element placement operation process according to an embodiment of the present invention.

FIG. 3 illustrates a process flow diagram of a virtual storage element placement operation process according to an embodiment of the present invention. In the illustrated virtual storage element placement operation process, a request to associate a virtual storage element with a storage area network is initially received (process block 302). Such a request may correspond to a request to add a new virtual storage element to a SAN, or to optimize the placement of an existing virtual storage element within a SAN.

Once the request is received, a user (e.g., a SAN or storage administrator) is prompted for data specifying one or more access characteristics of the corresponding virtual storage element (process block 304) and the data is subsequently received (process block 306). In alternative embodiments of the present invention, virtual storage element access characteristics may be obtained using any of a variety of techniques. For example, a request to add a virtual storage element to SAN 100 may be required to include such access characteristic data, thus eliminating the need to prompt a user for such data, or a default access characteristic (e.g., exclusive access by the host data processing system from which a request to add the virtual storage element to the SAN unless explicitly contradicted) may be implemented or presumed.

Once an access characteristic for the virtual storage element to be placed is obtained, it is used, along with SAN topology data and virtualization device data to select a virtualization device selection heuristic (process block 308). According to one embodiment, such SAN topology data and/or virtualization device data is similarly received from a user at substantially the same time as or after the request to associate or "place" the virtual storage element is received. In an alternative embodiment of the present invention, such SAN topology or virtualization device data may be independently stored prior to the receipt of the request to place the virtual storage element and accessed or retrieved as needed during the illustrated virtual storage element placement operation process. According to the illustrated embodiment, the selected virtualization device selection heuristic is then applied to select a virtualization device within the SAN (process block 310) which is then associated with the virtual storage element (process block 312) such that the virtual storage element may be presented to one or more host data processing systems.

According to one embodiment of the present invention, a number of virtualization device selection heuristics are provided for application. Using a first virtualization device selection heuristic, a virtual storage element which is to be accessed exclusively by an application host is associated with the virtualization device which is substantially adjacent to that application host. In other words, the virtualization device which is separated from the application host by a fewest number of SAN elements (e.g., links, virtualization devices, or the like) as compared with all other virtualization devices of the SAN. Using a second virtualization device selection heuristic, a virtual storage element which is to be accessed by a plurality of application hosts is associated with the virtualization device which is substantially equidistant (in terms of the number of SAN elements interposed therebetween) from each of the plurality of application hosts sharing the virtual storage element. Using a third virtualization device selection heuristic, a virtual storage element is associated with a virtualization device such that virtualization device limitations are recognized and the unnecessary loading of any one virtualization device of the SAN is avoided.

Figure 4B:
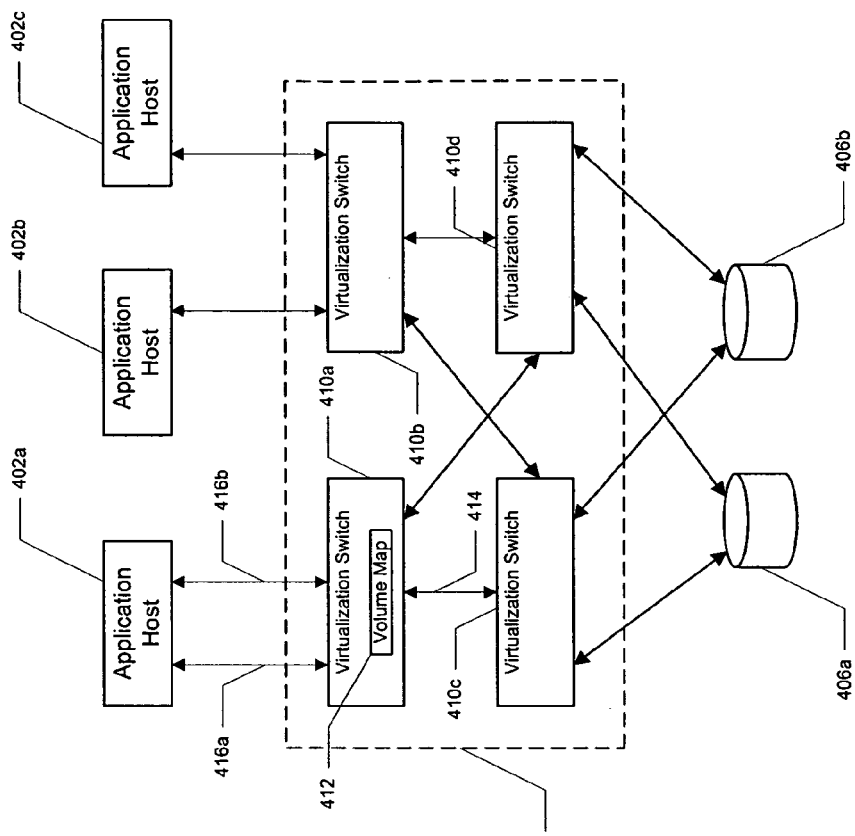
FIGS. 4a and 4b illustrate a first exemplary application of a first virtualization device selection heuristic according to an embodiment of the present invention.
Figure 4A:
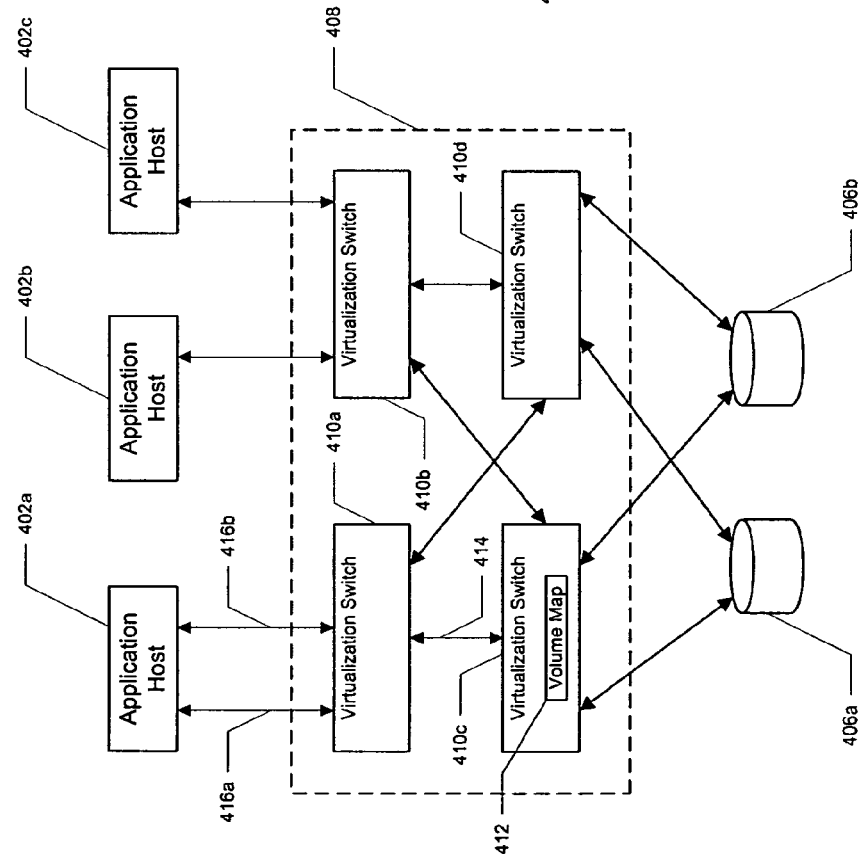

FIGS. 4a and 4b illustrate a first exemplary application of a first virtualization device selection heuristic according to an embodiment of the present invention. FIGS. 4a and 4b depict a SAN including a number of application hosts 402a-402c, data storage elements 406a-406b, and a SAN interconnect 408 including a number of virtualization devices (e.g., virtualization switches 410a-410d) coupled together using one or more links (e.g., host-switch links 416a-416b and inter-switch link 414). In the embodiment of FIGS. 4a and 4b, a virtual storage element within one or more of data storage elements 406a-406b is to be accessed exclusively by application host 402a. Using a conventional (i.e., manual) virtual storage element placement technique, the virtual storage element may be associated with or "presented by" virtualization switch 410c as depicted in FIG. 4a.

Consequently a volume map 412 corresponding to the virtual storage element is stored at virtualization switch 410c and access to volume map 412 by application host 402a is limited to the bandwidth available over inter-switch link 414. Where a first virtualization device selection heuristic according to an embodiment of the present invention is applied as depicted in FIG. 4b by contrast, the virtual storage element is associated with, and consequently volume map 412 is stored at, virtualization switch 410. Consequently, application host 402a may access volume map 412 and therefore the virtual storage element using both host-switch links 416a-416b thereby increasing bandwidth utilization (where the total bandwidth of host-switch links 416a-416b is greater than that of inter-switch link 414).

FIGS. 5a and 5b illustrate a second exemplary application of a first virtualization device selection heuristic according to an embodiment of the present invention. FIGS. 5a and 5b depict a SAN including a number of application hosts 502a-502d, data storage elements 506a-506b, and a SAN interconnect 508 including a number of virtualization devices (e.g., virtualization switches 510a-510g) coupled together using one or more links. In the embodiment of FIGS. 5a and 5b, a first virtual storage element within one or more of data storage elements 506a-506b is to be accessed exclusively by application host 502a, a second virtual storage element within one or more of data storage elements 506a-506b is to be accessed exclusively by application host 502b, and a third virtual storage element within one or more of data storage elements 506a-506b is to be accessed exclusively by application host 502c.

Using a conventional virtual storage element placement technique, volume maps 512a-512c corresponding to the first, second, and third virtual storage elements respectively may all be stored at virtualization switch 510d as depicted in FIG. 5a. Consequently, a failure of virtualization switch 510d would necessitate the failover of each virtual storage element, impacting each of application hosts 502a-502c. Where the described first virtualization device selection heuristic is applied as depicted in FIG. 5b however, volume map 512a corresponding to the first virtual storage element is stored at virtualization switch 510a while volume maps 512b and 512c corresponding to the second and third virtual storage elements respectively are stored at virtualization switch 510b, thereby reducing the impact of a failure of either virtualization switch.

FIGS. 6a and 6b illustrate an application of a second virtualization device selection heuristic according to an embodiment of the present invention. FIGS. 6a and 6b depict a SAN including a number of application hosts 602a-602c, data storage elements 606a-606b, and a SAN interconnect 608 including a number of virtualization devices (e.g., virtualization switches 610a-610d) coupled together using one or more links (e.g., host-switch links 616a-616c and inter-switch links 614a-614c). In the embodiment of FIGS. 6a and 6b, a virtual storage element within one or more of data storage elements 606a-606b is to be accessed by each of application hosts 602a-602c. Using a conventional virtual storage element placement technique the virtual storage element may be associated with (i.e., presented by) virtualization switch 610a as depicted in FIG. 6a.

Consequently a volume map 612 corresponding to the virtual storage element is stored at virtualization switch 610a and access to volume map 612 by application hosts 602a-602c is limited to the bandwidth available over inter-switch link 614a. Where a second virtualization device selection heuristic according to an embodiment of the present invention is applied as depicted in FIG. 6b by contrast, the virtual storage element is associated with, and consequently volume map 612 is stored at, virtualization switch 610d. Consequently, application hosts 602a-602c may each access volume map 612 and therefore the virtual storage element using independent links (e.g., inter-switch links 614a-614c) thereby increasing bandwidth utilization.

Figures 7A, 7B:
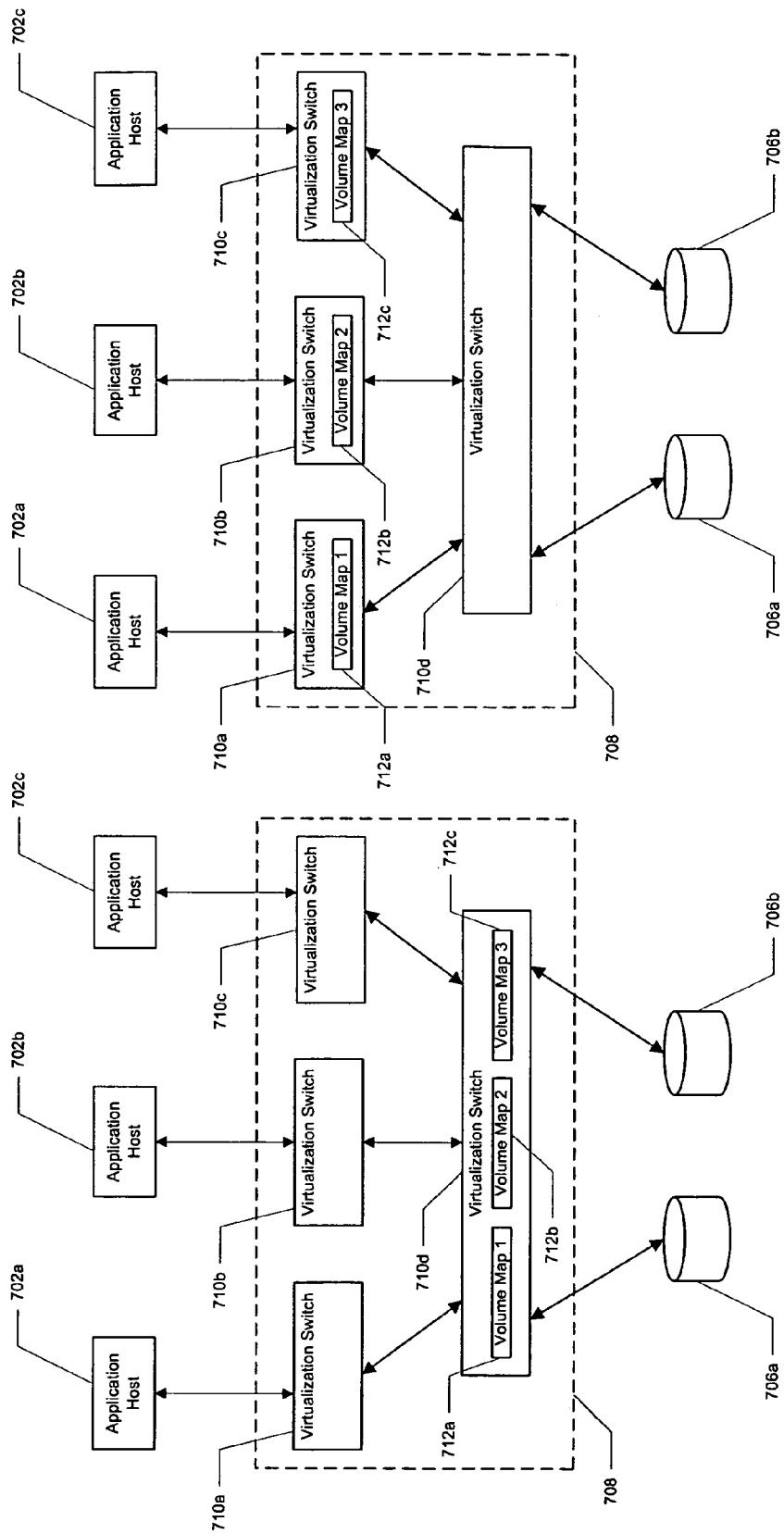
FIGS. 7a and 7b illustrate an application of a third virtualization device selection heuristic according to an embodiment of the present invention.

FIGS. 7a and 7b illustrate an application of a third virtualization device selection heuristic according to an embodiment of the present invention. FIGS. 7a and 7b depict a SAN including a number of application hosts 702a-702c, data storage elements 706a-706b, and a SAN interconnect 708 including a number of virtualization devices (e.g., virtualization switches 710a-710d) coupled together using one or more links. In the embodiment of FIGS. 7a and 7b, a first virtual storage element within one or more of data storage elements 706a-706b is to be accessed exclusively by application host 702a, a second virtual storage element within one or more of data storage elements 706a-706b is to be accessed exclusively by application host 702b, and a third virtual storage element within one or more of data storage elements 706a-706b is to be accessed exclusively by application host 702c. Using a conventional virtual storage element placement technique, volume maps 712a-712c corresponding to the first, second, and third virtual storage elements respectively may all be stored at virtualization switch 710d as depicted in FIG. 7a.

Consequently, limitations of virtualization switch 710d may create an I/O bottleneck and reduce overall efficiency. Every virtualization device or switch is likely to have some limitations based on the number of faults (e.g., cache misses) that the virtualization device is capable of handling at its ports. Such faults may be generated when, for example, there is an absence of a logical unit number (LUN)-mapping at a port (e.g., due to port memory limitations), or where the number of complex I/O operations (e.g., replication, snapshot, or the like) being performed at the ports by the virtualization device is large. To avoid unnecessarily loading any one virtualization switch within a SAN interconnect, a third virtualization device selection heuristic may be applied to more evenly distribute volume maps and virtual storage element associations such as has been depicted in FIG. 7b.

Figure 8:
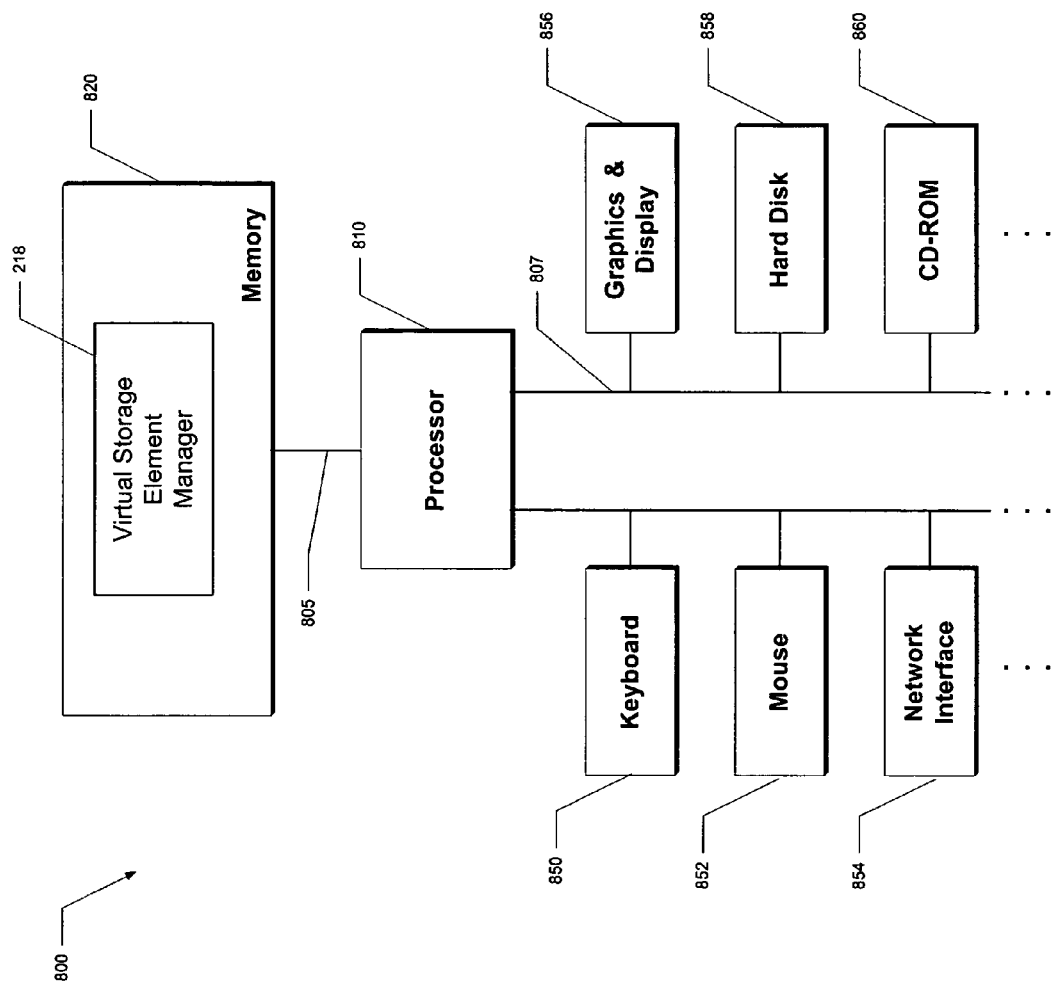
FIG. 8 illustrates a data processing system useable with one or more embodiments of the present invention.

FIG. 8 illustrates a data processing system useable with one or more embodiments of the present invention. Data processing system 800 can be used, for example, to implement one or more nodes of a larger data processing system. Data processing system 800 of the illustrated embodiment includes a processor 810 and a memory 820 coupled together by communications bus 805. Processor 810 can be a single processor or a number of individual processors working together. Memory 820 is typically random access memory (RAM), or some other dynamic storage device, and is capable of storing instructions to be executed by the processor(s), e.g., virtual storage element manager 218. Memory 820 is also used for storing temporary variables or other intermediate data during the execution of instructions by processor 810.

Data processing system 800 of the illustrated also includes devices such as keyboard 850, and mouse 852, network interface 854, graphics & display 856, hard disk 858, and CD-ROM 860, all of which are coupled to processor 810 by communications bus 807. It will be apparent to those having ordinary skill in the art that data processing system 800 can also include numerous elements not shown in the figure, such as additional storage devices, communications devices, input devices, and output devices, as illustrated by the ellipsis shown.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Shell, Perl and Tcl/Tk. Virtual storage element manager 218 can be provided to the data processing system via a variety of machine-readable media including electronic media (e.g., flash memory), magnetic storage media (e.g., hard disk 858, a floppy disk, etc.), optical storage media (e.g., CD-ROM 860).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a first information, wherein said first information specifies an access characteristic of a virtual storage element; and
   selecting a virtualization device of a plurality of virtualization devices in a storage area network using said first information, a second information and a third information, wherein said second information specifies a topology of said storage area network, wherein
      said third information comprises a virtualization device selection heuristic, and said selecting said virtualization device further comprises
selecting the virtualization device selection heuristic of a plurality of virtualization device selection heuristics using said first information and said second information.

2. The method of claim 1, wherein said method further comprises
receiving a request to associate said virtual storage element with said storage area network, and
receiving said first information comprises
prompting a user for said first information in response to receiving said request to associate said virtual storage element with said storage area network; and
receiving said first information in response to said prompting.

3. The method of claim 1, further comprising storing a virtual storage element map on said virtualization device wherein the virtual storage element map maps the virtual storage element to one or more additional storage elements or to one or more storage elements.

4. The method of claim 1, further comprising storing a virtual storage element map on said virtualization device wherein said virtual storage element map comprises a volume map and said virtual storage element comprises a data volume.

5. The method of claim 1 wherein each of the plurality of virtualization devices comprises a switch.

6. The method of claim 1, further comprising:
supporting a first application host by storing a first virtual storage element map on said virtualization device;
supporting a second application host by storing a second virtual storage element map on a second virtualization device of said plurality virtualization devices; and
storing a third virtual storage element map on said second virtualization device.

7. The method of claim 1, wherein said virtualization device selection heuristic maximizes bandwidth utilization by selecting storage of a virtual storage element map on said virtualization device on the basis of a pair of host-switch links directly linking said virtualization device to an application host.

8. A machine-readable storage medium storing a plurality of instructions executable by a machine, wherein said plurality of instructions when executed cause said machine to perform a method comprising:
in response to the machine receiving a first information that specifies an access characteristic of a virtual storage element, selecting a virtualization device of a plurality of virtualization devices in a storage area network using said first information, a second information, and a third information wherein
said second information specifies a topology of said storage area network,
said third information comprises a virtualization device selection heuristic, and
said selecting said virtualization device further comprises
selecting the virtualization device selection heuristic of a plurality of virtualization device selection heuristics using said first information and said second information.

9. The machine-readable storage medium of claim 8 wherein each of the plurality of virtualization devices comprises a switch.

10. The machine-readable storage medium of claim 8 wherein said virtual storage element map comprises a volume map and said virtual storage element comprises a data volume.

11. The machine-readable storage medium of claim 8, said method further comprising:
supporting a first application host by storing a first virtual storage element map on said virtualization device;
supporting a second application host by storing a second virtual storage element map on a second virtualization device of said plurality virtualization devices; and
storing a third virtual storage element map on said second virtualization device.

12. The method of claim 8, wherein said virtualization device selection heuristic maximizes bandwidth utilization by selecting storage of a virtual storage element map on said virtualization device on the basis of a pair of host-switch links directly linking said virtualization device to an application host.

13. An apparatus comprising:
means for receiving a first information, wherein
said first information specifies an access characteristic of a virtual storage element;
means for selecting a virtualization device of a plurality of virtualization devices in a storage area network using said first information, a second information, and a third information wherein
said second information specifies a topology of said storage area network,
said third information comprises a virtualization device selection heuristic, and
said selecting said virtualization device further comprises
selecting the virtualization device selection heuristic of a plurality of virtualization device selection heuristics using said first information and said second information.

14. The apparatus of claim 13, further comprising:
means for supporting a first application host by storing a first virtual storage element map on said virtualization device;
means for supporting a second application host by storing a second virtual storage element map on a second virtualization device of said plurality virtualization devices; and
means for storing a third virtual storage element map on said second virtualization device.

15. The apparatus of claim 13, wherein said virtualization device selection heuristic maximizes bandwidth utilization by selecting storage of a virtual storage element map on said virtualization device on the basis of a pair of host-switch links directly linking said virtualization device to an application host.

16. A storage area network comprising:
a storage area network interconnect comprising a plurality of virtualization devices; and
a storage resource manager coupled to said storage area network interconnect and configured to:
receive a first information, wherein said first information specifies an access characteristic of a virtual storage element,
select a virtualization device of said plurality of virtualization devices using said first information, a second information, and a third information wherein
said second information specifies a topology of said storage area network, said third information comprises a virtualization device selection heuristic, and said selecting said virtualization device further comprises selecting the virtualization device selection heuristic of a plurality of virtualization device selection heuristics using said first information and said second information.

17. The storage area network of claim 16, further comprising:

means for supporting a first application host by storing a first virtual storage element map on said virtualization device;

means for supporting a second application host by storing a second virtual storage element map on a second virtualization device of said plurality virtualization devices; and means for storing a third virtual storage element map on said second virtualization device.

18. The storage area network of claim 16, wherein said virtualization device selection heuristic maximizes bandwidth utilization by selecting storage of a virtual storage element map on said virtualization device on the basis of a pair of host-switch links directly linking said virtualization device to an application host.

* * * * *